(12) United States Patent
Nakagawa et al.

(10) Patent No.: US 12,290,886 B2
(45) Date of Patent: May 6, 2025

(54) ARC START ADJUSTMENT DEVICE, WELDING SYSTEM AND ARC START ADJUSTMENT METHOD

(71) Applicant: DAIHEN Corporation, Osaka (JP)

(72) Inventors: Shinichiro Nakagawa, Osaka (JP); Shugo Hirota, Osaka (JP)

(73) Assignee: DAIHEN Corporation, Osaka (JP)

( * ) Notice: Subject to any disclaimer, the term of this patent is extended or adjusted under 35 U.S.C. 154(b) by 0 days.

(21) Appl. No.: 17/697,174

(22) Filed: Mar. 17, 2022

(65) Prior Publication Data

US 2022/0203472 A1 Jun. 30, 2022

Related U.S. Application Data

(62) Division of application No. 16/172,177, filed on Oct. 26, 2018, now Pat. No. 11,292,072.

(30) Foreign Application Priority Data

Nov. 28, 2017 (JP) ................................. 2017-228249

(51) Int. Cl.
B23K 9/095 (2006.01)
B23K 9/067 (2006.01)
B23K 9/10 (2006.01)
B23K 9/173 (2006.01)
(Continued)

(52) U.S. Cl.
CPC ............ B23K 9/0953 (2013.01); B23K 9/067 (2013.01); B23K 9/0671 (2013.01); B23K 9/0956 (2013.01); B23K 9/1062 (2013.01); B23K 9/173 (2013.01); B23K 37/02 (2013.01); B25J 9/161 (2013.01); B25J 9/163 (2013.01)

(58) Field of Classification Search
CPC .... B23K 9/125; B23K 9/0672; B23K 9/0737; B23K 9/0956; B23K 9/1062
USPC ................. 219/130.21, 130.33, 130.1, 130.4
See application file for complete search history.

(56) References Cited

U.S. PATENT DOCUMENTS

2009/0107960 A1 4/2009 Hampton
2014/0116999 A1 5/2014 Suzuki et al.
(Continued)

FOREIGN PATENT DOCUMENTS

CN 1583341 A 2/2005
CN 101811213 A 8/2010
CN 103785926 A 5/2014
(Continued)

OTHER PUBLICATIONS

Decision to Grant a Patent for Japanese Application No. 2017-228249 dated Dec. 2, 2019, with its English translation, 5 pages.
(Continued)

Primary Examiner — Jeffrey T Carley
Assistant Examiner — Alba T Rosario-Aponte
(74) Attorney, Agent, or Firm — Rudy J. Ng; Bret E. Field; Bozicevic, Field & Francis LLP

(57) ABSTRACT

An arc start adjustment device adjusting an arc start procedure in a welding process comprises an obtainment unit that obtains welding data indicating a welding state during or after a welding process, and a procedure adjustment unit that adjusts the arc start procedure such that the cycle time of the welding process is shortened based on welding data obtained by the obtainment unit.

4 Claims, 9 Drawing Sheets

(51) Int. Cl.
B23K 37/02 (2006.01)
B25J 9/16 (2006.01)

(56) References Cited

U.S. PATENT DOCUMENTS

2017/0028499 A1   2/2017  Yoshida et al.
2017/0032281 A1*  2/2017  Hsu .................... G05B 23/0229

FOREIGN PATENT DOCUMENTS

| JP | 10244483 A | * | 9/1998 |
| JP | H10-244483 A | | 9/1998 |
| JP | 2003-145266 A | | 5/2003 |
| JP | 2007-216303 A | | 8/2007 |
| JP | 2011200867 A | * | 10/2011 |
| JP | 2014-69225 A | | 4/2014 |
| JP | 2014069225 A | * | 4/2014 |
| JP | 2014188544 A | * | 10/2014 |
| JP | 2017-030014 A | | 2/2017 |
| JP | 2017-039160 A | | 2/2017 |

OTHER PUBLICATIONS

Office Action for U.S. Appl. No. 16/172,177 dated Sep. 3, 2021, 21 pages.

Bzymek et al., Analysis of images recorded during welding processes, 9th International Conference on Quantitative InfraRed Thermography, Jul. 2-5, 2008, Krakow-Poland, 12 pages.

Chand et al., Prediction Welding Quality in Multi-Pass Welding Process Using Mahalanobis Distance Method, Applied Mechanics and Materials vols. 291-294 (2013) pp. 2688-2693.

Mazlan et al., Monitoring the quality of welding based on welding current and ste analysis, IOP Conf. Series: Materials Science and Engineering 257 (2017) 012043, 6 pages.

Horvat et al., Monitoring Gas Metal Arc Welding Process by Using Audible Sound Signal, Strojniški vestnik—Journal of Mechanical Engineering 57(2011) 267-278.

Pröllochs et al., Reinforcement Learning, Business Analytics Practice, Winter Term 2015/16, 2015-2016, 49 pages.

Abbeel, CS 188: Artificial Intelligence, Reinforcement Learning (RL), UC Berkeley, 2012, 9 pages.

Arulkumaran et al., A Brief Survey of Deep Reinforcement Learning, IEEE Signal Processing Magazine 34(6), Special Issue on Deep Learning for Image Understanding (ARXIV Extended Version), 16 pages, Aug. 2017.

Roig, Deep Neural Networks, Brains Minds and Machines summer school 2016, 59 pages.

Roth, Neural Networks, CS 446 Machine Learning Fall 2016, Oct. 4, 2016, 25 pages.

Kukacka, Overview of Deep Neural Networks, WDS'12 Proceedings of Contributed Papers, Part I, 100-105, 2012.

* cited by examiner

ARC START ADJUSTMENT DEVICE, WELDING SYSTEM AND ARC START ADJUSTMENT METHOD

CROSS-REFERENCE TO RELATED APPLICATIONS

This Nonprovisional application is a division of U.S. patent application Ser. No. 16/172,177 filed on Oct. 26, 2018, which application claims priority under 35 U.S.C. § 119 (a) on Patent Application No. 2017-228249 filed in Japan on Nov. 28, 2017, the entire contents of which are hereby incorporated by reference.

FIELD

The present invention relates to an arc start adjustment device that adjusts an arc start procedure in a welding process, a welding system and an arc start adjustment method.

BACKGROUND

A consumable electrode type gas shield arc welding method in known as a kind of welding methods. The gas shield arc welding method is a method in which an electric arc is caused between a welding wire fed to a region to be welded of a base metal and the base metal, and the base metal is welded by the heat of the electric arc. The method is particularly for performing welding with shield gas injected around the region to be welded in order to protect the base metal heated to high temperature from oxidation.

In the case of performing arc welding by the use of a welding robot, an arc is caused by an arc start procedure in which a welding torch is moved to a welding start position, then a wire starts to be slowed down, and welding current is supplied at the timing when the welding wire is in contact with a base metal. Here, since the welding robot starts to move the welding torch after an arc forms, the robot is uselessly stopped for a period from when the welding torch reaches the welding start position to when the arc forms, which is a cause of decrease in productivity.

As a technique to solve such a problem, Japanese Patent Application Laid-Open No. H10 (1998)-244483 discloses a technique in which arc start processing has been started before the welding torch reaches the welding start position, so that productivity is improved. More specifically, slowing down the wire feeding in advance, setting a wire slow down speed to high, or the like enable shortening of the time required for the arc start processing.

It is noted that Japanese Patent Application Laid-Open No. 2017-30014 discloses a technique in which welding conditions are automatically set by machine learning using image data obtained by imaging a welding region, outer appearance data of a weld bead obtained by processing this image data, data on an amount of generated spatter, and the like.

Furthermore, Japanese Patent Application Laid-Open No. 2017-39160 discloses a technique in which the quality determination of a welding result is performed based on welding monitor data such as welding current, welding voltage, wire feeding speed, etc. that are measured during the welding process.

SUMMARY

However, in the case where the arc start processing is executed in advance, the welding quality may be deteriorated due to various factors. In order to ensure the welding quality, the operator is required to repeatedly perform arc start processing manually and perform setting to conditions that appear to be optimum from a number of test results.

An object of the present disclosure is to provide an arc start adjustment device that is capable of automatically shortening the cycle time of a welding process, especially the time from when the welding torch reaches the welding start position to when the arc forms.

An arc start adjustment device according to the present disclosure being an arc start adjustment device adjusting an arc start procedure in a welding process comprises: an obtainment unit that obtains welding data indicative of a welding state during or after a welding process, and a procedure adjustment unit that adjusts the arc start procedure such that a cycle time of the welding process is shortened based on the welding data obtained by the obtainment unit.

The arc start adjustment method according to the present disclosure is an arc start adjustment method of adjusting an arc start procedure in a welding process, and comprises: obtaining welding data indicative of a welding state during or after the welding process; and adjusting the arc start procedure such that a cycle time of the welding process is shortened based on obtained welding data.

According to the present disclosure, it is possible to automatically shorten the cycle time of a welding process, especially the time required from when the welding torch reaches the welding start position to when the arc forms.

The above and further objects and features will more fully be apparent from the following detailed description with accompanying drawings.

DETAILED DESCRIPTION

Figure 1:
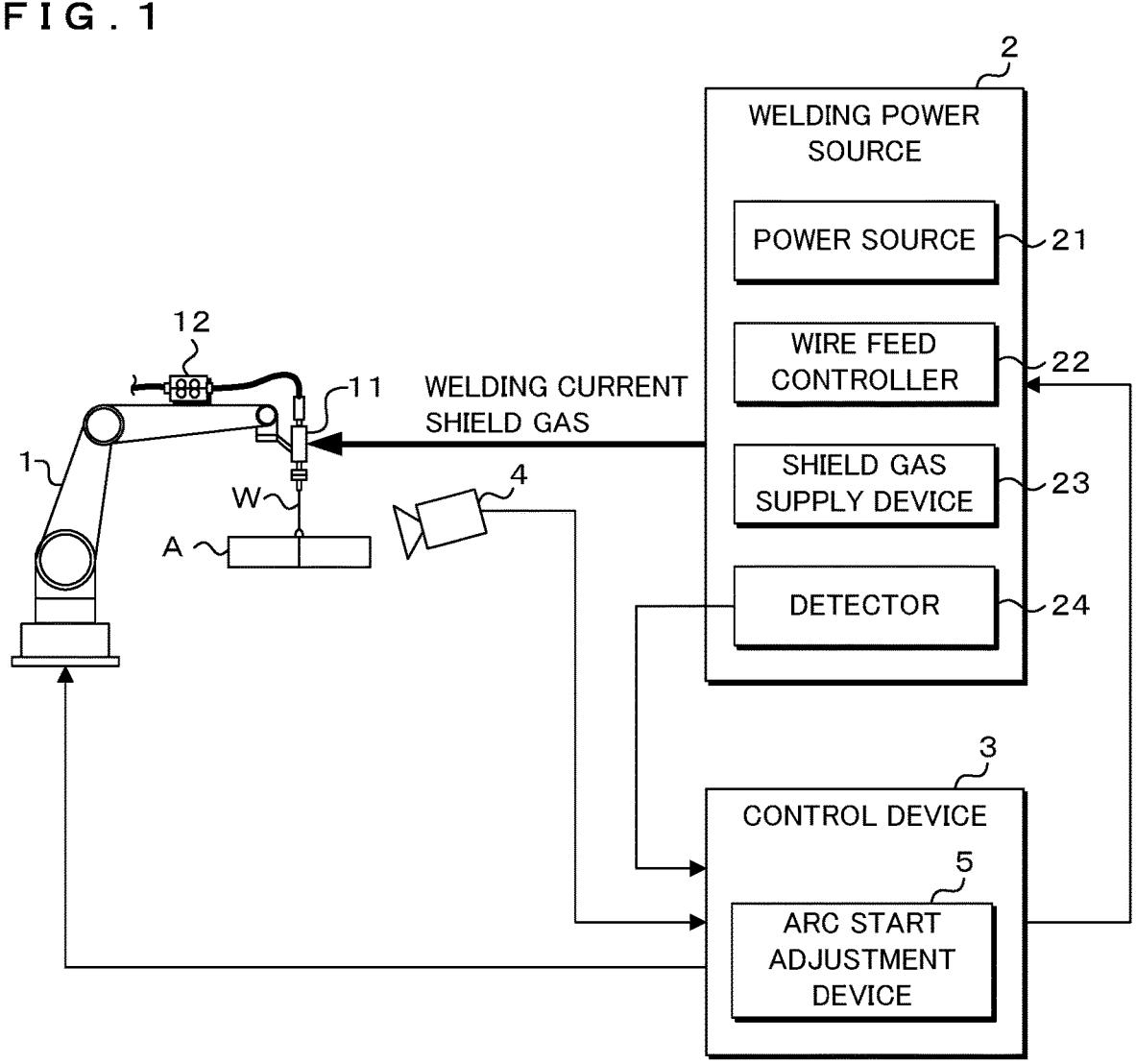
FIG. 1 is a schematic view depicting an arc welding system according to Embodiment 1.

Embodiments of the present disclosure are concisely listed. It is noted that at least parts of the embodiments described below may arbitrarily be combined.

An arc start adjustment device according to the present disclosure being an arc start adjustment device adjusting an arc start procedure in a welding process comprises: an obtainment unit that obtains welding data indicative of a welding state during or after a welding process, and a procedure adjustment unit that adjusts the arc start procedure such that a cycle time of the welding process is shortened based on the welding data obtained by the obtainment unit.

According to the present aspect, the obtainment unit obtains welding data, and the procedure adjustment unit adjusts an arc start procedure based on the obtained welding data. The welding data is information indicative of a welding state and includes information as to whether or not the cycle time can be shortened, whether or not the cycle time should be extended, etc. The procedure adjustment unit can adjust the arc start procedure by using the welding data such that the cycle time of the welding process is shortened without worsening the welding result and can shorten the cycle time of the arc start procedure.

The arc start adjustment device according to the present disclosure further comprises a quality determination unit that determines whether a welding result is positive or negative based on the welding data obtained by the obtainment unit, and the procedure adjustment unit decides a change in the arc start procedure such that the cycle time is shortened if the quality determination unit determines that the welding result is positive, and the cycle time is extended if the quality determination unit determines that the welding result is negative.

According to the present aspect, if the welding result is positive, the arc start adjustment device shortens the cycle time of the welding process because there is a probability that the cycle time of the welding process has room for being shortened. If the welding result is negative, the arc start adjustment device extends the cycle time of the welding process. By such adjustment processing, the cycle time of the welding process can be shortened while the welding result is worsen as little as possible.

In the arc start adjustment device according to the present disclosure, the procedure adjustment unit finalizes the adjustment by the arc start procedure before the cycle time is shortened if the welding result changes from a positive state to a negative state as a result of shortening the cycle time of the welding process, and stores a finalized arc start procedure in a storage device.

According to the present aspect, the cycle time of the welding process can be minimized, and the storage device stores the arc start procedure with the minimum cycle time. The minimum arc start procedure is not necessarily an arc start procedure with the minimum cycle time that is logically obtained. The minimum arc start procedure means the arc start procedure before the cycle time being shortened when the welding result changes from a positive state to a negative state as a result of shortening the cycle time of the welding process.

Henceforth, the cycle time can immediately be shortened by using the arc start procedure stored in the storage device.

In the arc start adjustment device according to the present disclosure, the quality determination unit includes a quality determination neural network that trains a neural network to output data indicating the quality of a welding result concerning a welding process when the welding data is obtained in a case where the welding data is input.

According to the present aspect, the quality determination neural network which is, for example, a learned deep neural network and can appropriately determine the quality of the welding result. The kind of the neural network is not limited to a specific one but may be selected from a convolutional neural network (CNN), a recurrent neural network (RNN), a long short-term memory (LSTM) or the like depending on the features of the welding data.

In the arc start adjustment device according to the present disclosure, the procedure adjustment unit includes a procedure adjustment neural network that trains a neural network to output data indicating a change in the arc start procedure that is capable of shortening the cycle time of the welding process in a case where the welding data is input.

According to the present aspect, the procedure adjustment neural network is, for example, a learned deep neural network and can appropriately adjust the arc start procedure. The kind of the neural network is not limited to a specific one but may be selected from CNN, RNN, LSTM or the like depending on the features of the welding data.

In the arc start adjustment device according to the present disclosure, the procedure adjustment neural network outputs data indicative of a change amount of the arc start procedure.

According to the present aspect, the procedure adjustment neural network can output not data as to whether or not the cycle time of the welding process is to be shortened but data as to the change amount of the adjustable arc start procedure. For example, the procedure adjustment neural network can output a large change amount if the welding result is extremely stable and output a small change amount if the welding result is positive but not stable. Accordingly, the cycle time of the welding process can be shortened more promptly.

The arc start adjustment device according to the present disclosure further comprises: a quality determination unit that determines whether a welding result is positive or negative based on the welding data obtained by the obtainment unit; and a learning processing unit that trains the procedure adjustment neural network based on a result determined by the quality determination unit obtained after the arc start procedure is adjusted.

According to the present aspect, the procedure adjustment neural network is trained by using the data indicative of the welding result when the arc start procedure is adjusted. Accordingly, the cycle time of the welding process can be shortened more effectively in order that the welding result is not worsen.

In the arc start adjustment device according to the present disclosure, the learning processing unit trains the procedure adjustment neural network such that the cycle time is shortened if the quality determination unit determines that the determination result is positive while the cycle time is extended if the quality determination unit determines that the determination result is negative.

According to the present aspect, the procedure adjustment neural network can be trained in the direction in which the cycle time of the welding process is shortened. By the training, the cycle time of the welding process can be minimized.

In the arc start adjustment device according to the present disclosure, the learning processing unit trains the procedure adjustment neural network such that the cycle time is maintained if the welding result is in a moderate state between positive and negative states.

According to the present aspect, the procedure adjustment neural network can be trained such that the cycle time of the welding process can be maintained if the welding result is in a moderate state between positive and negative states. The moderate state is a state where the welding result is relatively good but is likely to be worsen if the cycle time is shortened any further. By the training, the cycle time of the welding process can be minimized, and the welding result can be stabilized at a positive state.

In the arc start adjustment device according to the present disclosure, the quality determination unit includes a quality determination neural network that trains a neural network to output data indicating the quality of a welding result concerning a welding process when the welding data is obtained in a case where the welding data is input.

According to the present aspect, the quality determination neural network is, for example, a learned deep neural network, and can appropriately determine the quality of the welding result. By using the quality determination result from the quality determination neural network, the procedure adjustment neural network can be trained more effectively.

In the arc start adjustment device according to the present disclosure, the procedure adjustment neural network includes a network structure substantially the same as all or a part of the quality determination neural network.

According to the present aspect, the procedure adjustment neural network includes a neuron structure substantially the same as all or a part of the quality determination neural network. For example, a part of the procedure adjustment neural network has intermediate layers and weighting factors the same or substantially the same as whole or a part of the quality determination neural network. The quality determination of the welding result and the adjustment of the arc start procedure have partially common features, so that the quality determination neural network can be employed as the procedure adjustment neural network. That is, the initial values of the weighting factors of the procedure adjustment neural network can be set to more appropriate values. Accordingly, even if training data for training the arc start procedure is not enough, if training data of the welding data and data indicative of the quality of the welding result, i.e., whether the welding result is positive or negative may be sufficiently prepared, the initial values of the weighting factor of the procedure adjustment neural network can appropriately be set, so that the procedure adjustment neural network can efficiently be trained. Needless to say, the procedure adjustment neural network and the quality determination neural network may have the same network structure.

The arc start adjustment device according to the present disclosure comprises a quality determination unit that determines the quality of the welding result based on welding data obtained by the obtainment unit, and a state data obtainment unit that obtains state data including image data obtained by imaging a welding torch, a welding wire and a base metal at multiple time points in arc start processing. The procedure adjustment unit comprises: an evaluation unit that calculates, based on state data obtained by the state data obtainment unit and action data indicative of an action concerning the arc start procedure, an evaluation value for the action in a state indicated by the state data; an action selection unit that selects an action for which an evaluation value calculated by the evaluation unit is maximum; a reward calculation unit that calculates a reward for the arc start procedure based on a result determined by the quality determination unit obtained after the arc start procedure is adjusted and a time from when the welding torch reaches a welding region to when an arc forms; and a reinforcement learning unit that trains the evaluation unit based on the state data obtained by the state data obtainment unit, the action data indicative of the action concerning the arc start procedure and the reward calculated by the reward calculation unit.

According to the present aspect, reinforcement learning of the arc start procedure with the shortened cycle time of the welding process is made possible.

In the arc start adjustment device according to the present disclosure, the evaluation unit comprises an evaluation neural network to output an evaluation value for the action in the state indicated by the state data in the case where the state data obtained by the state data obtainment unit and the action data indicative of the action concerning the arc start procedure are input.

According to the present aspect, deep reinforcement learning of the arc start procedure with the shortened cycle time of the welding process is made possible.

In the arc start adjustment device according to the present disclosure, the welding data includes data indicative of at least one of welding current and welding voltage detected during the welding process, a feeding speed of a welding wire, a short-circuit situation, a welding sound collected during the welding process and an image of a welding region imaged after the welding process.

According to the present aspect, the arc start procedure can be adjusted by using the data indicative of at least one of welding current and welding voltage detected during the welding process, a feeding speed of the welding wire, a short-circuit situation, a welding sound collected during the welding process and an image of a welding region imaged after the welding process.

In the arc start adjustment device according to the present disclosure, the arc start procedure includes at least one of a start timing of slowing down the wire feeding, a wire slow down speed, a start timing of supplying welding current and a welding current value at the start of forming an arc.

According to the present aspect, the cycle time of the welding process can be shortened by adjusting a start timing of slowing down the wire feeding, a wire slow down speed, a start timing when welding current is supplied or a welding current value when an arc starts.

A welding system according to the present disclosure comprises the arc start adjustment device according to any one of the above mentioned devices; a welding robot with a welding torch; and a welding power source that supplies welding current to the welding torch.

According to the present aspect, the welding system including the welding robot and the welding power source can shorten the cycle time of the welding process. Note that the arc start adjustment device may be provided inside the welding robot and the welding power source, may be provided inside a control device to control the operations of the welding robot and welding power source, or may be provided as a separate device external to the welding robot, the welding power source and the control device. Alternatively, the arc start adjustment device may be a server while the control device or the welding power source may communicate with the server to shorten the cycle time of the welding process.

The arc start adjustment method according to the present disclosure is an arc start adjustment method of adjusting an arc start procedure in a welding process, and comprises: obtaining welding data indicative of a welding state during or after the welding process; and adjusting the arc start procedure such that a cycle time of the welding process is shortened based on obtained welding data.

According to the present aspect, the cycle time of the welding process can be shortened. The arc start adjustment method may automatically be implemented by the welding power source, the control device, or the like constituting the welding system, or the arc start adjustment method may be implemented by the operator connecting the arc start adjustment device to the welding system.

The present disclosure will be described in detail below with reference to the drawings depicting embodiments.

Moreover, at least parts of embodiments that will be described below may arbitrarily be combined.

Embodiment 1

FIG. 1 is a schematic view depicting an arc welding system according to Embodiment 1. The arc welding system according to the present embodiment is a consumable electrode type gas shield arc welding machine and includes a welding robot 1, a welding power source 2, a control device 3, an imaging device 4 and an arc start adjustment device 5. The arc start adjustment device 5 is provided in the control device 3.

The welding robot 1 is for automatically performing arc welding of a base metal A. The welding robot 1 is provided with a base portion fixed at an appropriate position on a floor surface. The base portion is rotatably coupled with multiple arms via shaft portions, and at the tip end portion of the arms, a welding torch 11 is held. Furthermore, at an appropriate position of the arms, a wire feed device 12 is provided. The coupled portion between the arms is provided with a motor, and each arm is rotated about the shaft portion by a rotational driving force of the motor. The rotation of the motor is controlled by the control device 3. The control device 3 can move the welding torch 11 in the upper, lower, back, forth, right and left directions relative to the base metal A by rotating each of the arms. Moreover, the coupled portion between the arms is provided with an encoder to output a signal indicative of a rotating position of the arm to the control device 3, and the control device 3 recognizes the position of the welding torch 11 based on the signal output from the encoder.

The welding torch 11 is made of an electrically conducting material such as a copper alloy or the like, and guides a welding wire W to the base metal A which is to be welded and has a cylindrical contact tip to supply welding current required for forming arc. The welding current is supplied from the welding power source 2. The welding wire W is fed to the welding torch 11 from a wire feed source (not illustrated) by a wire feed device 12. The welding wire W is, for example, a solid wire and functions as a consumable electrode.

The contact tip is in contact with the welding wire W inserted therethrough and supplies welding current to the welding wire W. Furthermore, the welding torch 11 has a nozzle, which has a hollow cylindrical shape so as to enclose the contact tip, and injects shield gas to the base metal A through the opening at the tip end portion thereof. The shield gas is to protect the base metal A and welding wire W that are molten by an arc from oxidization. The shield gas is inert gas such as carbon dioxide, a mixture of carbon dioxide and argon gas, argon or the like. The shield gas is supplied from the welding power source 2.

The welding power source 2 is provided with a power source 21, a wire feed controller 22, a shield gas supply device 23 and a detector 24. The power source 21 is connected to the contact tip of the welding torch 11 and the base metal A via a power supply cable and supplies welding current. The wire feed controller 22 controls the feeding speed of the welding wire W by the wire feed device 12. The shield gas supply device 23 supplies shield gas to the welding torch 11. The detector 24 includes a current detector to detect welding current flowing through an arc during the welding process and a voltage detector to detect voltage applied to the welding torch 11 and the base metal A. The power source 21 includes a power source circuit to output direct current that is subjected to PWM control based on the welding current and welding voltage detected by the detector 24, and also includes a signal processing circuit and so on. Moreover, the welding power source 2 outputs to the control device 3 welding monitor data indicative of a welding state during the welding process. The welding monitor data is, for example, welding current data or welding voltage data respectively indicating the welding current and the welding voltage detected during the welding process. In addition, as welding monitor data, feeding speed data indicative of the feeding speed of the welding wire W, short-circuit situation data indicative of the short-circuit situation, welding sound data collected by a microphone (not illustrated) may be output to the control device 3.

The imaging device 4 images a welding region of the base metal A after a welding process and outputs image data obtained by imaging to the control device 3.

The control device 3 controls the operation of the welding robot 1 as well as controls the operation of the welding power source 2 by outputting to the welding power source 2 welding conditions such as welding current, welding voltage, the feeding speed of the welding wire W, an amount of supplied shield gas, and so on. The control device 3 stores various welding conditions concerning the material of the base metal A, the kind of a groove and so on. Moreover, the control device 3 outputs an arc start procedure to thereby execute arc start processing. The above-described welding conditions stored by the control device 3 are not necessarily optimum ones, and the arc start procedure is adjusted by the arc start adjustment device 5 such that the cycle time of the welding process is minimized to the extent that the welding result is not worsen.

Figure 2:
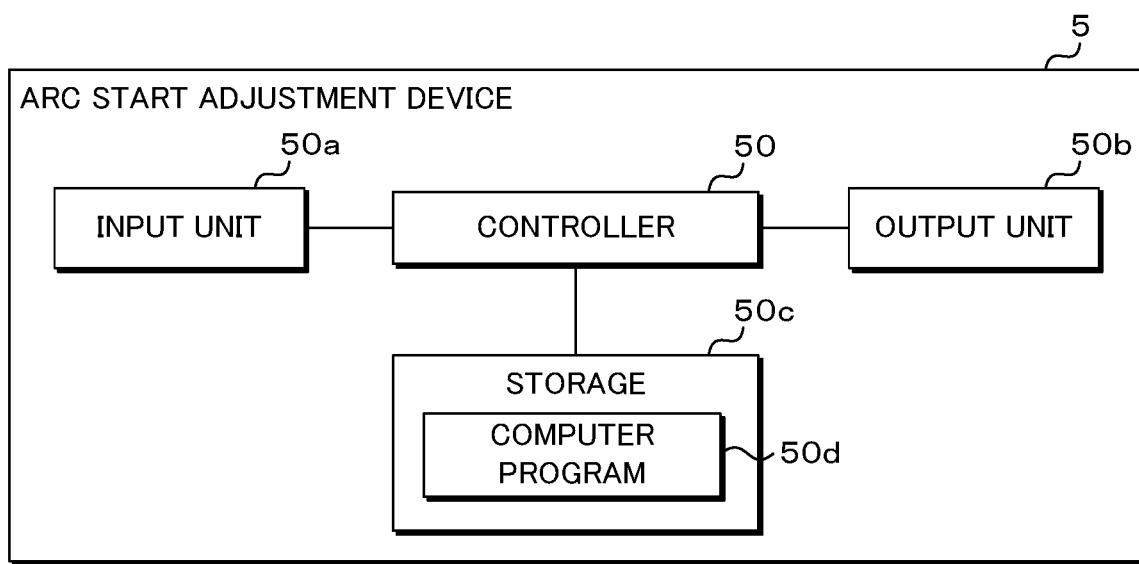
FIG. 2 is a block diagram depicting an arc start adjustment device according to Embodiment 1.

FIG. 2 is a block diagram depicting the arc start adjustment device 5 according to Embodiment 1. The arc start adjustment device 5 is provided with a controller 50 to control the operation of each of the components in the arc start adjustment device 5. The controller 50 is connected to an input unit 50*a*, an output unit 50*b* and a storage device 50*c*. The input unit 50*a* and the output unit 50*b* are an input circuit and an output circuit respectively.

The storage device 50*c* is a nonvolatile memory such as an electrically erasable programmable ROM (EEPROM), a flash memory or the like. The storage device 50*c* stores a computer program 50*d* including instructions to minimize the cycle time of a welding process to the extent that the welding result is not worsen.

The controller 50 is a computer including one or more processors such as a central processing unit (CPU), a graphics processing unit (GPU), a multi-core CPU, etc., a read only memory (ROM), a random access memory (RAM), input/output interfaces and so on, and the respective interfaces are connected to the input unit 50*a*, the output unit 50*b* and the storage device 50*c*. The controller 50 performs an arc start adjustment method to minimize the cycle time of the welding process by executing the computer program 50*d* stored in the storage device 50*c* and causes the computer to function as the arc start adjustment device 5.

The input unit 50*a* is connected to the welding power source 2 and the imaging device 4. The welding monitor data output from the welding power source 2 and the image data output from the imaging device 4 are input to the input unit 50*a*. The welding monitor data is time series data indicative of, for example, welding current, welding voltage, a feeding speed of the welding wire W, a short-circuit situation, a welding sound and the like. The image data is data representing the outer appearance of a weld bead.

The output unit 50*b* is connected to the welding robot 1 and the welding power source 2. The controller 50 controls a welding process and an arc start procedure, and outputs control data to change the arc start procedure to the welding robot 1 and the welding power source 2. The control data to change the arc start procedure may be data instructing a change of the arc start procedure or data indicating a changed arc start procedure.

Figure 3:
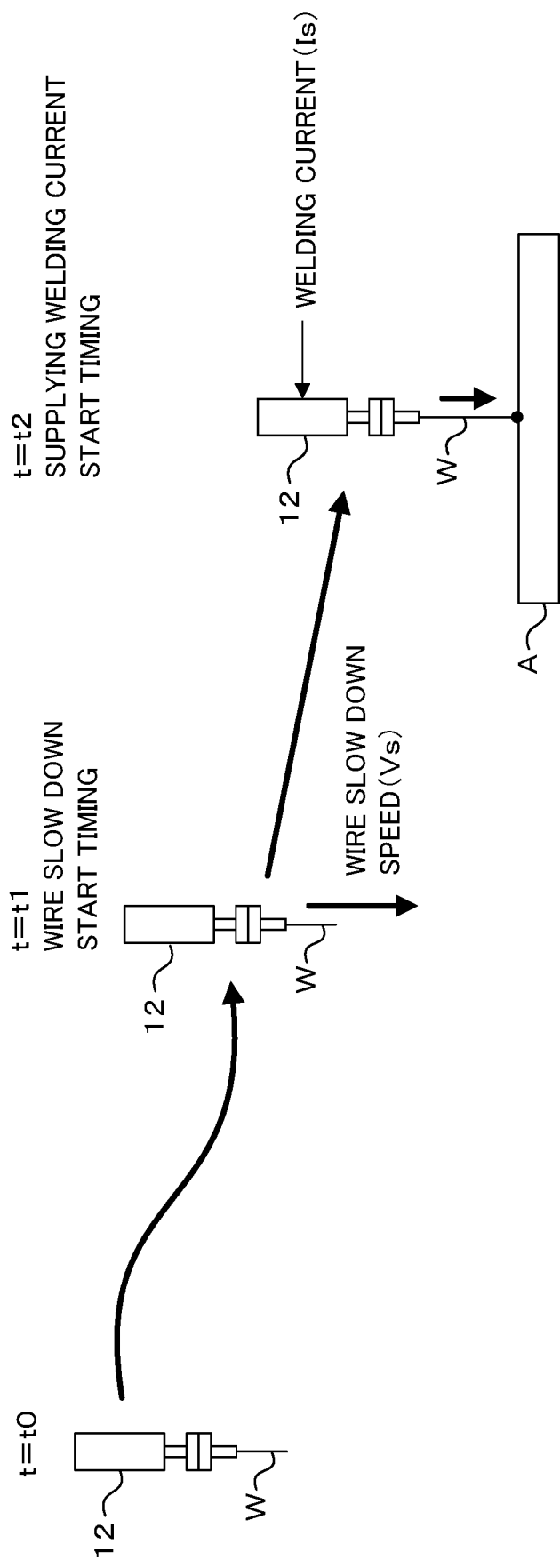
FIG. 3 is a conceptual view depicting an arc start procedure.

FIG. 3 is a conceptual view depicting the arc start procedure. The control device 3 starts the arc start procedure at an early stage of moving the welding torch 11 to the welding start position by controlling the welding robot 1. More specifically, the control device 3 starts to slow down the wire feeding at a specific timing (t=t1) at a specific feed speed Vs regarding a specific time point (t=t0) as a reference point, and supplies welding current of a specific welding current value (Is) to the welding wire W at a specific timing (t=t2), whereby arc forms to start welding. The arc start procedure includes at least a start timing t1 of slowing down the wire feeding, a wire slow down speed Vs, a start timing t2 of supplying welding current and a welding current value Is at the start of forming an arc, and so on.

Figure 4:
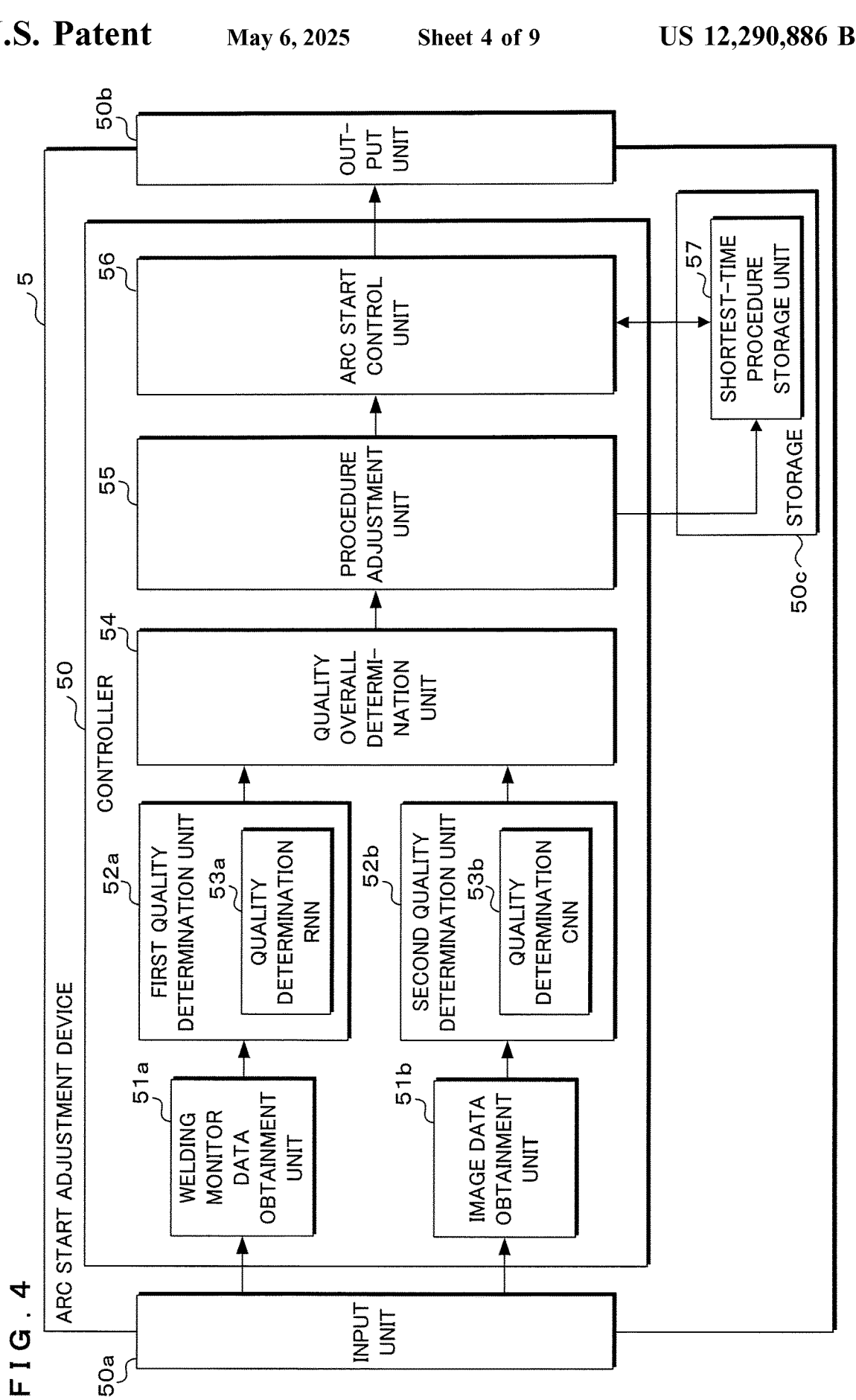
FIG. 4 is a functional block diagram depicting the arc start adjustment device according to Embodiment 1.

FIG. 4 is a functional block diagram depicting the arc start adjustment device 5 according to Embodiment 1. The arc start adjustment device 5 includes, as functional blocks, a welding monitor data obtainment unit 51a, an image data obtainment unit 51b, a first quality determination unit 52a, a second quality determination unit 52b, a quality overall determination unit 54, a procedure adjustment unit 55, an arc start control unit 56 and a shortest-time procedure storage unit 57.

The welding monitor data obtainment unit 51a obtains welding monitor data output from the welding power source 2 and outputs the obtained welding monitor data to the first quality determination unit 52a.

The image data obtainment unit 51b obtains image data output from the imaging device 4 and outputs the obtained image data to the second quality determination unit 52b.

The first quality determination unit 52a includes a quality determination recurrent neural network (RNN) 53a that outputs, if welding monitor data is input, data indicating the quality of the welding result concerning the welding process when the welding monitor data is obtained. The quality determination RNN 53a is a learned recurrent neural network, for example. The quality determination RNN 53a is stored in the storage 50c.

The quality determination RNN 53a includes in an output layer, for example, a first neuron that outputs data indicative of the probability of the welding result being positive and a second neuron that outputs data indicative of the probability of the welding result being negative. In this case, the above-mentioned data indicative of the quality of the welding result is data output from the first and second neurons.

Alternatively, the quality determination RNN 53a may include a neuron that outputs data indicative of the quality of the welding result in binary in the output layer. In this case, the above-mentioned data indicative of the quality of the welding result is binary data output from this neuron.

Further alternatively, the quality determination RNN 53a may include a neuron that outputs an analog value indicative of the degree of the quality of the welding result in the output layer.

The quality determination RNN 53a may be trained by providing a recurrent deep neural network before learning with welding monitor data (input data) and data indicating the quality of the welding result corresponding to the welding data (teaching data) as training data.

Note that the number of layers in an intermediate layer of the quality determination RNN 53a, the number of neurons in each layer and so on are not limited to a specific structure. Furthermore, the quality determination RNN 53a is not necessarily a recurrent neural network and may be structured by another type of neural network.

The second quality determination unit 52b includes a quality determination convolutional neural network (CNN) 53b that outputs, if image data is input, data indicative of the quality of the welding result concerning the welding process when the image data is obtained. The quality determination CNN 53b is a learned convolutional neural network. The quality determination CNN 53b is stored in the storage 50c.

The quality determination CNN 53b includes in an output layer, for example, a third neuron that outputs data indicative of the probability of the welding result being positive and a fourth neuron that outputs data indicative of the probability of the welding result being negative. In this case, the above-mentioned data indicative of the quality of the welding result is data output from the third and fourth neurons.

Alternatively, the quality determination CNN 53b may include a neuron that outputs data indicative of the quality of the welding result in binary in the output layer. In this case, the above-mentioned data indicative of the quality of the welding result is binary data output from this neuron.

Further alternatively, the quality determination CNN 53b may include a neuron that outputs an analog value indicative of the degree of the quality of the welding result in the output layer.

The quality determination CNN 53b may be trained by providing a convolutional neural network before learning with image data (input data) and data indicating the quality of the welding result corresponding to the image data (teaching data) as training data.

Note that the number of layers in an intermediate layer of the quality determination CNN 53b, the number of neurons in each layer and so on are not limited to a specific structure. Furthermore, the quality determination CNN 53b is not necessarily a convolutional neural network and may be structured by another type of neural network.

The quality overall determination unit 54 determines the quality of the welding result based on the data output from the first quality determination unit 52a and the second quality determination unit 52b, and outputs the determination result to the procedure adjustment unit 55.

For example, the quality overall determination unit 54 performs overall determination based on the data output from the first and second neurons of the quality determination RNN 53a and the data output from the third and fourth neurons of the quality determination CNN 53b. More specifically, the quality determination of the welding result may be made by comparing the sum of the data values output from the first neuron and the third neuron and the sum of the data values output from the second neuron and the fourth neuron. Furthermore, the values output from the respective neurons may be weighted and summed and then may be compared with one another.

In addition, in the case where the quality determination RNN 53a and the quality determination CNN 53b are configured to output binary data, if both of the first quality determination unit 52a and the second quality determination unit 52b output data indicative of a positive result, it is determined as "positive," while if either the first quality determination unit 52a or the second quality determination unit 52b outputs data indicative of a negative result, it is determined as "negative." Note that the overall determination method is one example, and it may be configured to determine as "positive" if either the first quality determination unit 52a or the second quality determination unit 52b outputs data indicative of a positive result.

The procedure adjustment unit 55 adjusts the arc start procedure such that the cycle time of the welding process is shortened if the result determined by the quality overall determination unit 54 is positive while the cycle time of the welding process is extended if the determination result is negative, and outputs the adjustment result to the arc start control unit 56. The adjustment result is, for example, data indicative of increase or decrease of various parameters of the arc start procedure, such as a start timing t1 of slowing down the wire feeding, a wire slow down speed Vs, a start timing t2 of supplying welding current and a welding current value Is at the start of forming an arc and so on. The procedure adjustment unit 55 outputs data indicative of increasing or decreasing at least one of the various parameters of the arc start procedure to the arc start control unit 56.

The procedure adjustment unit 55 may change values of multiple parameters or a value of one parameter, by a single adjustment processing. In the case where an arc start procedure is performed by repeatedly executing the processing from steps S11 to S19 described later until the cycle time is minimized, a different parameter may be adjusted in each adjustment processing repeatedly executed. For example, at the first adjustment, the start timing of slowing down the wire feeding may be adjusted, and at the second adjustment, the wire slow down speed may be adjusted.

Such a configuration may be taken that the variables may be reduced by brining increased and decreased amounts of the parameters into correlation with each other. For example, in the case where the wire slow down speed Vs is increased, the start timing of supplying welding current t2 may be made fast, that is, be slightly changed. Moreover, such a configuration may be taken that the change amount is restricted to a range within a predetermined rate of a standard parameter value.

In addition, in the case where the welding result changes from a positive state to a negative state as a result of the procedure adjustment unit 55 determining that the cycle time of the welding process is shortened, the procedure adjustment unit 55 stores the arc start procedure before the cycle time is shortened in the shortest-time procedure storage device 57.

The arc start control unit 56 controls the arc start by outputting to the welding power source 2 control data to change the arc start procedure based on the adjustment result by the procedure adjustment unit 55. Note that if the shortest-time procedure storage device 57 has stored the arc start procedure that makes the cycle time of the welding process shortest, the arc start control unit 56 controls an arc start based on the arc start procedure stored in the shortest-time procedure storage device 57.

The following describes a processing procedure performed by the controller 50 relating to the adjustment of the arc start procedure.

Figure 5:
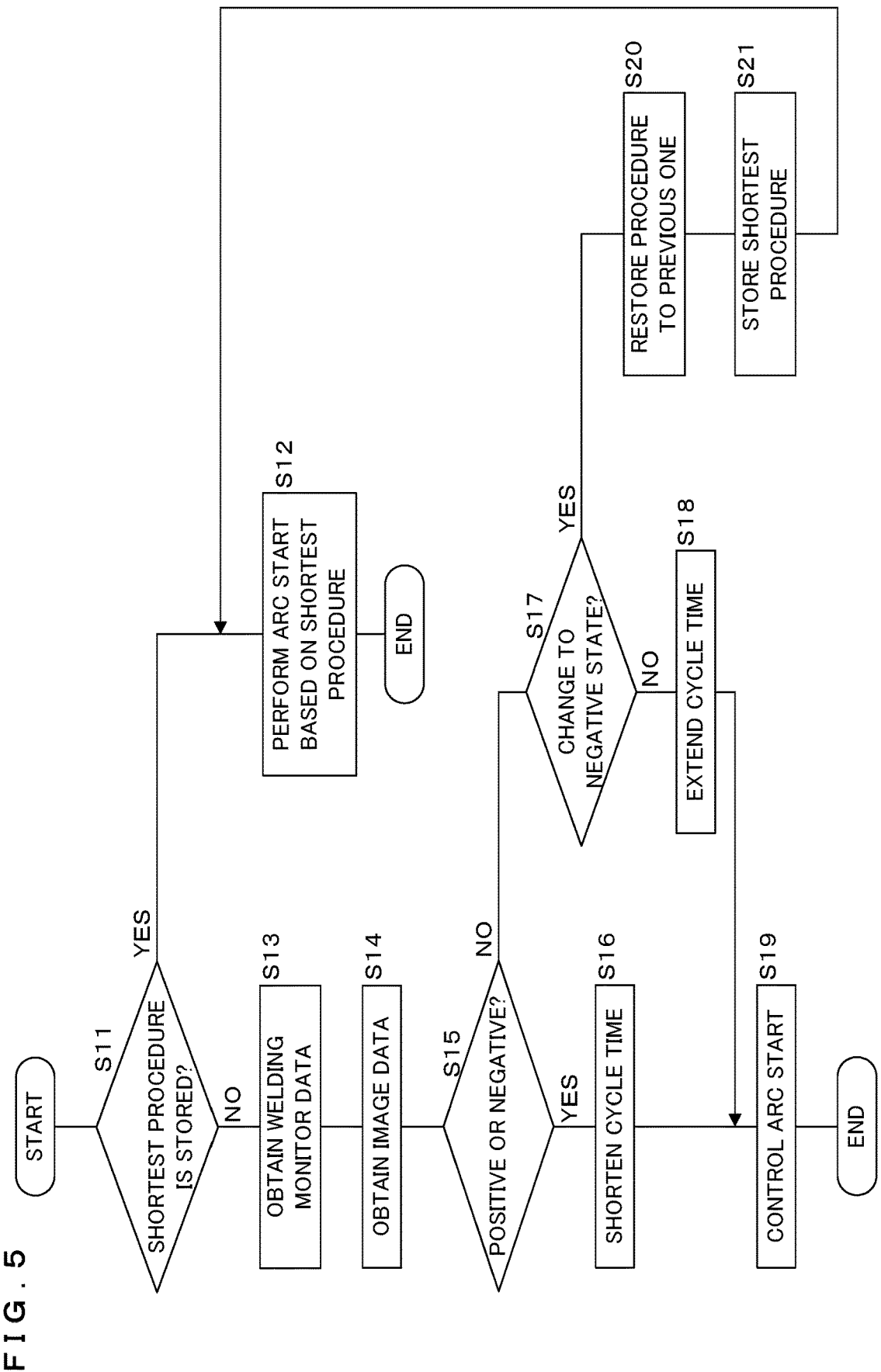
FIG. 5 is a flowchart depicting an arc start adjustment method according to Embodiment 1.

FIG. 5 is a flowchart depicting an arc start adjustment method according to Embodiment 1. The controller 50 repeatedly executes, for example, the following processing for every welding process. The controller 50 determines whether or not the arc start procedure that makes the cycle time shortest is stored in the storage device 50c (step S11). If determining that the arc start procedure that makes the cycle time shortest is stored (step S11: YES), the controller 50 performs an arc start based on the shortest arc start procedure stored in the storage device 50c (step S12). For example, the controller 50 controls the arc start by outputting the control data indicative of the shortest arc start procedure to the welding power source 2. It is understood that the controller 50 may control the arc start by outputting control data indicative of the change amount to make the cycle time shortest to the welding power source 2.

If determining that the arc start procedure that makes the cycle time shortest is not stored in the storage device 50c (step S11: NO), the controller 50 obtains welding monitor data (step S13) and obtains image data (step S14). The controller 50 then determines the quality of the welding result based on the obtained welding monitor data and image data (step S15). For example, the controller 50 determines the quality of the welding result by using the learned quality determination RNN 53a and the learned quality determination CNN 53b.

Next, if determining that the welding result is positive (step S15: YES), the controller 50 shortens the cycle time of the welding process (step S16). If determining that the welding result is negative (step S15: NO), the controller 50 determines whether or not the welding result changes from a positive state to a negative state at the previous time as a result of the welding process being shortened (step S17). Obviously, the change to the negative state may be determined by two or more welding results without being restricted to be determined by a single welding result. For example, if the welding result is negative in a certain number of times or more out of ten times, a change to the negative state may be determined. If determining that the welding result does not change from a positive state to a negative state (step S17: NO), the controller 50 extends the cycle time of the welding process (step S18). The controller 50 having completed the processing at step S16 or S18 controls the arc start based on the adjusted arc start procedure (step S19). More specifically, the controller 50 controls arc start by outputting to the welding power source 2 the control data indicative of the arc start procedure after the adjustment processing. The controller 50 may control the arc start by outputting to the welding power source 2 control data indicative of the change amount for the arc start procedure.

If determining that the welding result changes from a positive state to a negative state as a result of the cycle time of the welding process being shortened (step S17: YES), the controller 50 restores the cycle time of the welding process to that of the arc start procedure before shortening (step S20), stores the arc start procedure before the cycle time is shortened as an arc start procedure with the shortest cycle time in the storage device 50c (step S21) and returns the processing to step S12.

The arc start adjustment device 5 thus configured, the welding system, the arc start adjustment method and the computer program 50d may effectively shorten the cycle time of the welding process without worsening the welding result.

Moreover, since the minimized arc start procedure is configured to be stored in the storage device 50c, the arc start adjustment device 5 may control the welding by promptly minimizing the cycle time of the welding process henceforth.

Note that Embodiment 1 described an example that the arc start adjustment device 5 is provided with the learned quality determination RNN 53a and the learned quality determination CNN 53b. However, such a configuration may be employed that various parameters defining the neural networks of the first quality determination unit 52a and the second quality determination unit 52b may be downloaded from an external server for an update. The parameters are information including, for example, the number of layers in an intermediate layer, the number of neurons in each layer, the weighting factor of each neuron, the kind of an active function, and the like. Furthermore, the arc start adjustment device 5 may be configured to store a flag indicating whether or not the downloaded various parameters are permitted to be reflected on the first quality determination unit 52a and the second quality determination unit 52b, and to update the neural networks of the quality determination RNN 53a and the quality determination CNN 53b by using the downloaded parameters if the flag indicates permission.

Moreover, if multiple welding systems each provided with an arc start adjustment device 5 are installed in a factory, the arc start adjustment devices 5 of the welding systems may exchange the above-mentioned parameters with each other as necessary.

Additionally, the arc start adjustment device 5 may be structured as a cloud server. The welding power source 2 or the control device 3 may request the server to adjust the arc start procedure, receive an adjustment amount of the arc start procedure transmitted from the server in response to the request and adjust the arc start procedure.

In addition, the arc start adjustment device 5 may be provided in the welding power source 2. Furthermore, the arc start adjustment device 5 may be implemented as a dedicated device for the arc start procedure adjustment. The operator may automatically adjust the arc start procedure by connecting this dedicated device to the welding system.

Moreover, such an example is described that the first quality determination unit 52a and the second quality determination unit 52b are respectively provided with the quality determination RNN 53a and the quality determination CNN 53b, but both or either one of the determination units may be configured to determine the quality of the welding result without using a neural network. For example, the first quality determination unit 52a may determine the quality of the welding result by such simple determination processing of comparing a welding current value and a predetermined threshold. Furthermore, the second quality determination unit 52b may determine the quality of the welding result by such simple determination processing of extracting a predetermined feature value from the image data and comparing the presence or absence of the feature value, the numeral of the feature value, etc. and the threshold. Moreover, it is not necessary to provide both of the first quality determination unit 52a and the second quality determination unit 52b, and either one of them may be provided. In this case, the quality overall determination unit 54 is not required.

Embodiment 2

Figure 6:
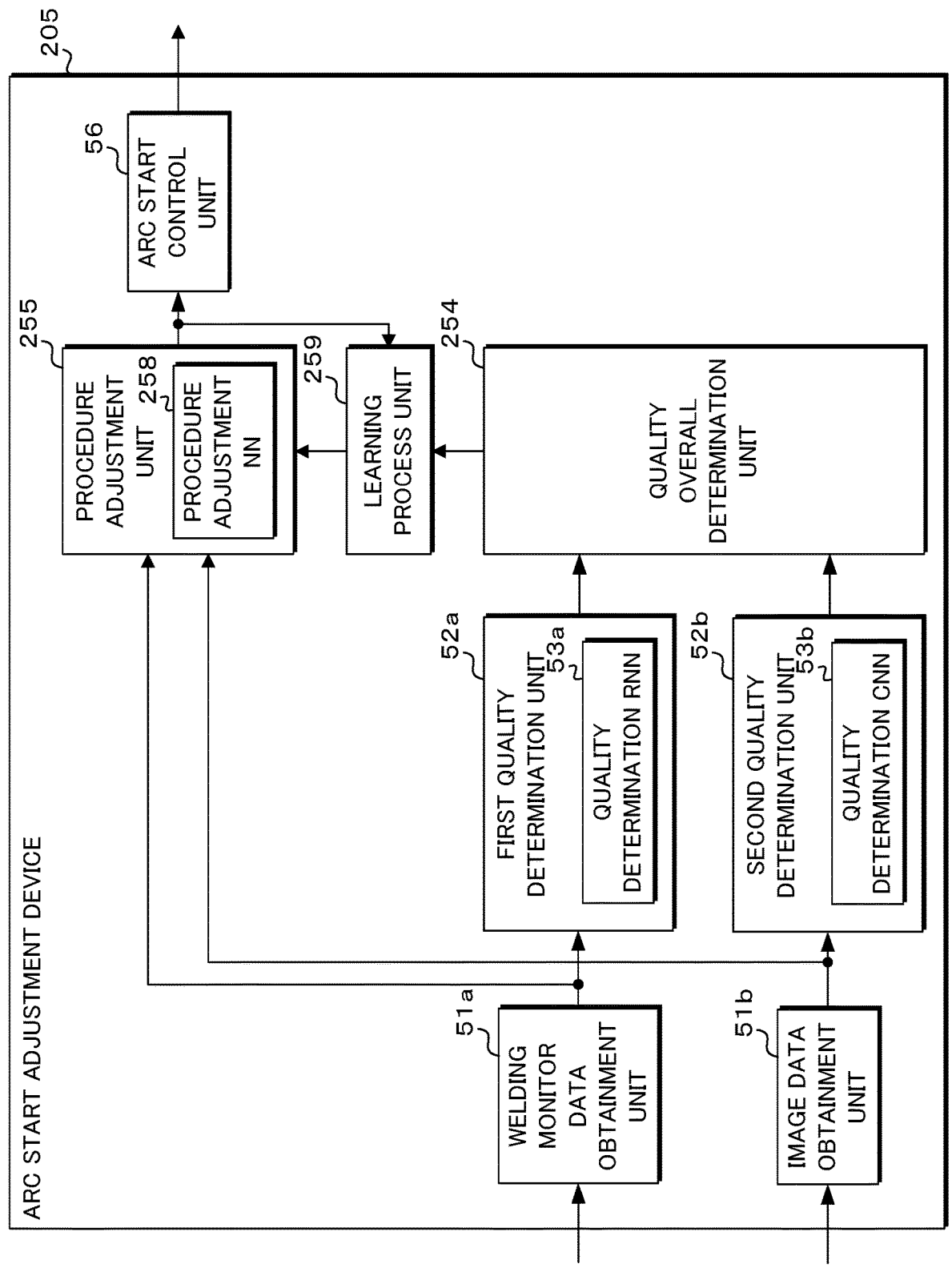
FIG. 6 is a functional block diagram depicting an arc start adjustment device according to Embodiment 2.

FIG. 6 is a functional block diagram depicting an arc start adjustment device 205 according to Embodiment 2. The arc start adjustment device 205 according to Embodiment 2 includes a welding monitor data obtainment unit 51a, an image data obtainment unit 51b, a first quality determination unit 52a, a second quality determination unit 52b, a quality overall determination unit 254, a procedure adjustment unit 255 and an arc start control unit 56 similarly to Embodiment 1, and further includes a learning processing unit 259.

The arc start adjustment device 205, the welding system, the arc start adjustment method and the computer program 50d according to Embodiment 2 are different from those of Embodiment 1 in that the procedure adjustment unit 55 and the shortest-time procedure storage unit 57 according to Embodiment 1 are structured as a deep neural network, and thus the following mainly describes the above-mentioned differences. Since the other configurations and effects are the same as those in Embodiment 1, the same reference numerals are given to the corresponding parts while the description thereof is omitted.

The welding monitor data obtainment unit 51a obtains welding monitor data output from the welding power source 2 and outputs the obtained welding monitor data to the first quality determination unit 52a and the procedure adjustment unit 255.

The image data obtainment unit 51b obtains image data output by the imaging device 4 and outputs the obtained image data to the second quality determination unit 52b and the procedure adjustment unit 255.

The quality overall determination unit 254 according to Embodiment 2 outputs data indicative of the probability of the welding result being positive and data indicative of the probability of the welding result being negative to the learning processing unit 259. For example, the probability of the welding result being positive has only to be calculated by using the data value output from the first neuron of the quality determination RNN 53a and the data value output from the third neuron of the quality determination CNN 53b. Similarly, the probability of the welding result being negative has only to be calculated by using the data value output from the second neuron of the quality determination RNN 53a and the data value output from the fourth neuron of the quality determination CNN 53b.

The procedure adjustment unit 255 includes a procedure adjustment neutral network (NN) 258 that outputs data indicative of a change amount of the arc start procedure that is capable of shortening the cycle time if welding monitor data and image data are input. The procedure adjustment NN 258 is a learned deep neural network. The procedure adjustment NN 258 is stored in the storage 50c.

The procedure adjustment NN 258 includes multiple neurons in an output layer each outputting data indicative of the probability of each adjustment amount being suitable, for each of the multiple adjustment amounts relative to various adjustment parameters such as a start timing t1 of slowing down the wire feeding, a wire slow down speed Vs, a welding current value Is at the start of forming an arc, a start timing t2 of supplying welding current and so on.

Alternatively, the procedure adjustment NN 258 may be configured to include a neuron that outputs data indicative of an adjustment amount in the output layer. Further alternatively, the procedure adjustment NN 258 may be configured to include a neuron that outputs an adjustment amount in binary data in the output layer. In Embodiment 2, the procedure adjustment NN 258 is assumed to output not binary data but data indicative of the probability of the change amount for each of the parameters being suitable henceforth.

Note that the procedure adjustment unit 255 may change multiple parameter values or may change one parameter value, by single adjustment processing. Alternatively, such a configuration may be employed that a different parameter value is adjusted by each adjustment processing repeatedly performed.

Figure 7:
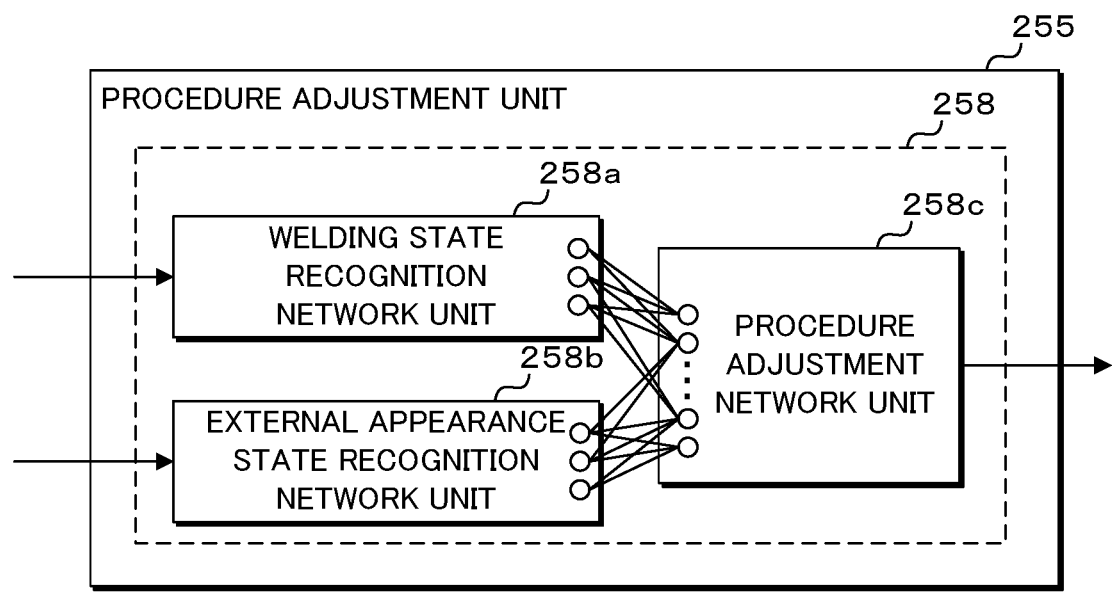
FIG. 7 is a conceptual view depicting a network structure of a procedure adjustment unit.

FIG. 7 is a conceptual view depicting the network structure of the procedure adjustment unit 255. The procedure adjustment NN 258 of the procedure adjustment unit 255 includes a welding state recognition network part 258a, an external appearance state recognition network part 258b and a procedure adjustment network part 258c.

The welding state recognition network part 258a is a neural network that receives an input of welding monitor data, recognizes a welding state during a welding process, and outputs data corresponding to this state. If the welding monitor data is welding current, the welding state recognition network part 258a can recognize a changed state of the welding current. The welding state recognition network part 258a may have a similar neural network structure to the first quality determination unit 52a except for the output layer, for example. The output layer includes multiple neurons, preferably three or more neurons. Furthermore, the weighting factors of the neurons constituting the first quality determination unit 52a may be set as initial values of the weighting factors before learning. Thus, the procedure adjustment unit 255 can be trained more efficiently.

The external appearance state recognition network part 258b is a neural network that receives an input of image data, recognizes the state of the welding region after welding, and outputs data corresponding to this state. The external appearance state recognition network part 258b may have a similar neural network structure to the second quality determination unit 52b except for the output layer, for example. The output layer includes multiple neurons, preferably three or more neurons. The weighting factors of the neurons constituting the second quality determination unit 52b may be set as initial values of the weighting factors before learning. Thus, the procedure adjustment NN 258 can be trained more efficiently.

The procedure adjustment network part 258c is a learned neural network that receives inputs of data output from the welding state recognition network part 258a and the external appearance state recognition network part 258b, and outputs data indicative of the change amount of the ark start procedure that may be shortened. This neural network is preferably structured by a deep neural network including multiple intermediate layers.

The structure of the neural network of the procedure adjustment unit 255 is one example, and the neural network may be structured by a single neural network or by multiple neural networks in combination.

The learning processing unit 259 is a processing unit to train the procedure adjustment NN 258 regarding the welding monitor data and the image data input to the procedure adjustment unit 255 as input data and regarding data indicative of the quality of the welding result when the arc start procedure is changed based on the data, as training data.

More specifically, the learning processing unit 259 trains the procedure adjustment NN 258 such that the cycle time is shortened if the welding result is positive, the cycle time is extended if the welding result is negative, and the cycle time is maintained if the welding result is in a moderate state between the positive state and the negative state, according to the determination result by the quality overall determination unit 254.

The state of the welding result being positive is, for example, a state where the probability of the welding result being positive is equal to or more than 50%, and the probability of the welding result being negative is less than 50%. The state of the welding result being negative is, for example, a state where the probability of the welding result being positive is less than 50%, and the probability of the welding result being negative is equal to or more than 50%. The threshold of 50% is one example and it may take a value larger than 50%.

The state of the welding result being moderate is, for example, a state where the probability of the welding result being positive and the probability of the welding result being negative are both equal to or more than 50%, or a state where both of them are less than 50%. In addition, if the above-described threshold is larger than 50%, for example, 60%, a state where the probability of the welding result being positive and the probability of the welding result being negative are both between 40% and 60% is also the moderate state. Note that such a moderate state is one example. The moderate state is a state where the welding result is likely to be worsen if the cycle time is shortened any further.

As discussed above, the procedure adjustment NN 258 is trained to thereby minimize the cycle time of the welding process without worsening the welding result.

Note that at the initial stage of the learning by the procedure adjustment NN 258, the arc start procedure may arbitrarily be changed without maintaining the cycle time in the case of the moderate state.

Here, the procedure adjustment NN 258 may be trained at an appropriate timing when a welding system is installed, when an external environment changes, when welding conditions are changed, or when replacement is performed, for example.

In addition, Embodiment 2 described an example that the procedure adjustment NN 258 is trained as an example, but a learned procedure adjustment NN 258 may be provided so as not to be further trained.

According to the arc start adjustment device 205, the welding system, the arc start adjustment method and the computer program 50d thus configured in Embodiment 2, the procedure adjustment unit 255 constituted by a deep neural network is configured to decide the change amount of the arc start procedure, so that the arc start in the welding process can be controlled more appropriately and can be shortened without worsening the welding result.

Furthermore, the procedure adjustment unit 255 can output the change amount of the arc start procedure that shortens the cycle time of the welding process. The procedure adjustment unit 255 can output a large change amount if the welding result is extremely stable, and output a small change amount if the welding result is positive but unstable, for example. Accordingly, the cycle time of the welding process can be minimized more swiftly.

Moreover, the procedure adjustment unit 255 can be trained by using the quality determination of the welding result, and thus it can be adjusted so as to be suitable for the environment where the welding system is installed. Accordingly, the cycle time of the welding process can be minimized depending on the welding condition and the external environment.

Additionally, the learning processing unit 259 can train the procedure adjustment unit 255 in the direction in which the cycle time of the welding process is shortened to thereby output data that is capable of minimizing the cycle time of the welding process, and then train the procedure adjustment neural network to stably obtain a positive welding result. Accordingly, the welding result can be kept in a positive state while the cycle time of the welding process can be minimized.

Note that Embodiment 2 described an example that the arc start adjustment device 205 includes the learned procedure adjustment NN 258, but various parameters defining the neural network of the procedure adjustment unit 225 may be downloaded from an external server for an update. The parameters are information including, for example, the number of layers in an intermediate layer, the number of neurons in each layer, the weighting factor of each neuron, the kind of an active function, and so on. Furthermore, the arc start adjustment device 205 may be configured to store a flag indicating whether or not the downloaded various parameters are permitted to be reflected on the procedure adjustment unit 255, and to update the neural network of the procedure adjustment NN 258 using the downloaded parameters if the flag indicates permission.

Moreover, if multiple welding systems each provided with arc start adjustment device 205 are installed in a factory, the arc start adjustment devices 205 of the welding systems may exchange the above-mentioned parameters with each other as necessary.

In addition, the arc start adjustment device 205 may be configured to upload the various parameters defining the learned procedure adjustment NN 258 to the external server. Another arc start adjustment device 205 may update the procedure adjustment NN 258 by using the parameters uploaded to the server.

Note that Embodiment 2 described an example that the procedure adjustment NN 258 as well as the first quality determination unit 52a and the second quality determination unit 52b each include a neural network, but both of the quality determination RNN 53 and the quality determination CNN 53b or either one of them may be configured to determine the quality of the welding result without using a neural network.

Embodiment 3

Figure 8:
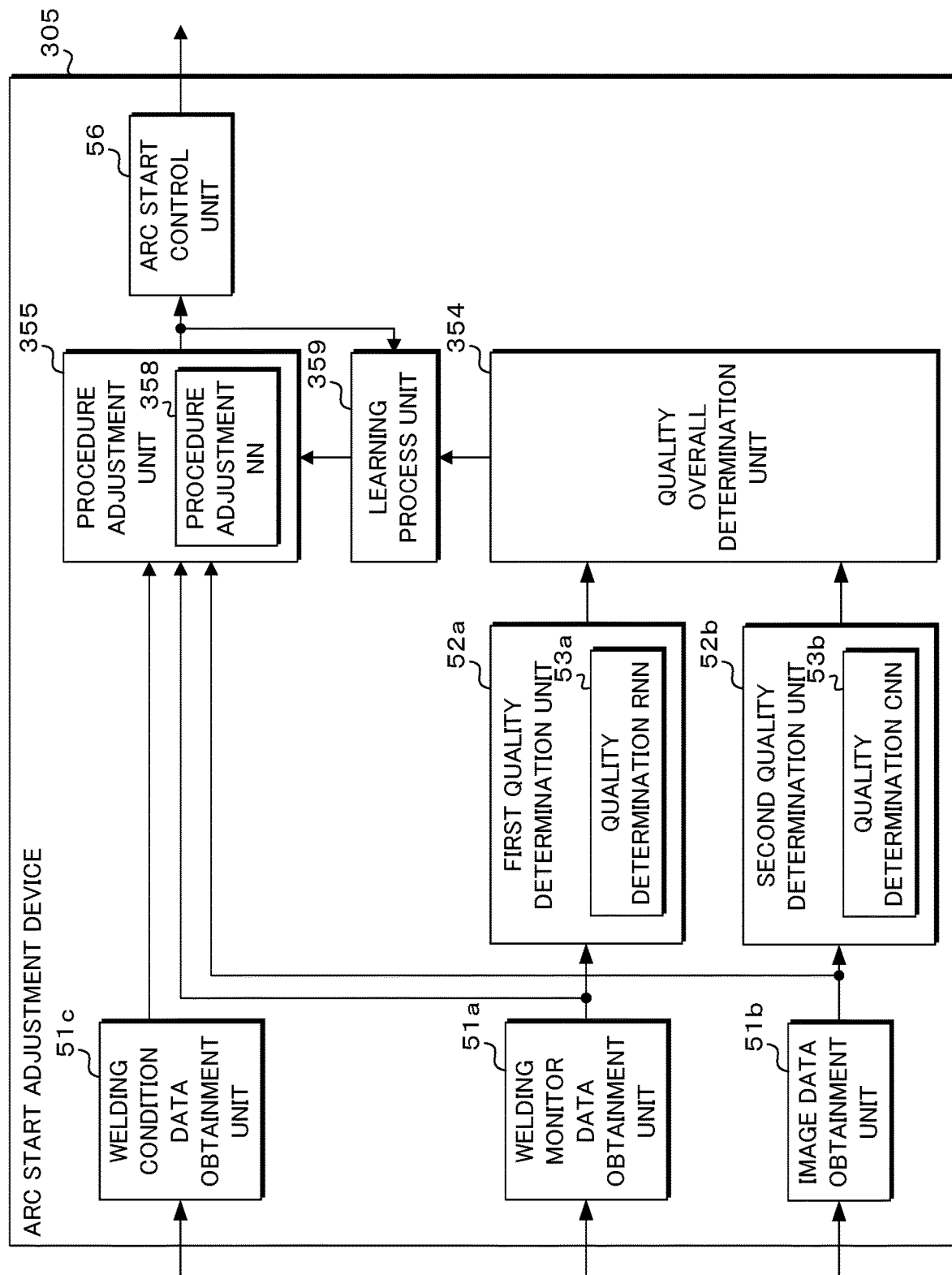
FIG. 8 is a functional block diagram depicting an arc start adjustment device according to Embodiment 3.

FIG. 8 is a functional block diagram depicting an arc start adjustment device 305 according to Embodiment 3. The arc start adjustment device 305, the welding system, the arc start adjustment method and the computer program 50d according Embodiment 3 are different from Embodiment 2 in data to be input to a procedure adjustment unit 355, and thus the difference will mainly be described below. Since the other configurations and effects are the same as those in the embodiments described herein, the same reference numerals are given to the corresponding parts, and the description thereof is omitted.

The arc start adjustment device 305 according to Embodiment 3 is further provided with a welding condition data obtainment unit 51c. The welding condition data obtainment unit 51c obtains welding condition data. The welding condition data includes information such as a material of the base metal A, a shape of the groove, a setting value for welding current, a setting value for welding voltage, a setting value for a welding speed, a setting value for frequency when welding current is periodically varied and so on.

The procedure adjustment unit 355 includes a learned procedure adjustment NN 358 that outputs data indicative of the change amount of the arc start procedure that is capable of shortening the cycle time of the welding process without worsening the welding result based on the input welding monitor data and image data as well as the welding condition data. The learned procedure adjustment NN 358 according to Embodiment 3 may be further trained by using a quality overall determination unit 354 and a learning processing unit 359 similarly to Embodiment 2.

According to the arc start adjustment device 305, the welding system, the arc start adjustment method and the computer program 50d in Embodiment 3, the arc start adjustment procedure is adjusted taking the welding conditions into account, so that the arc start procedure may be adjusted more effectively.

Embodiment 4

Figure 9:
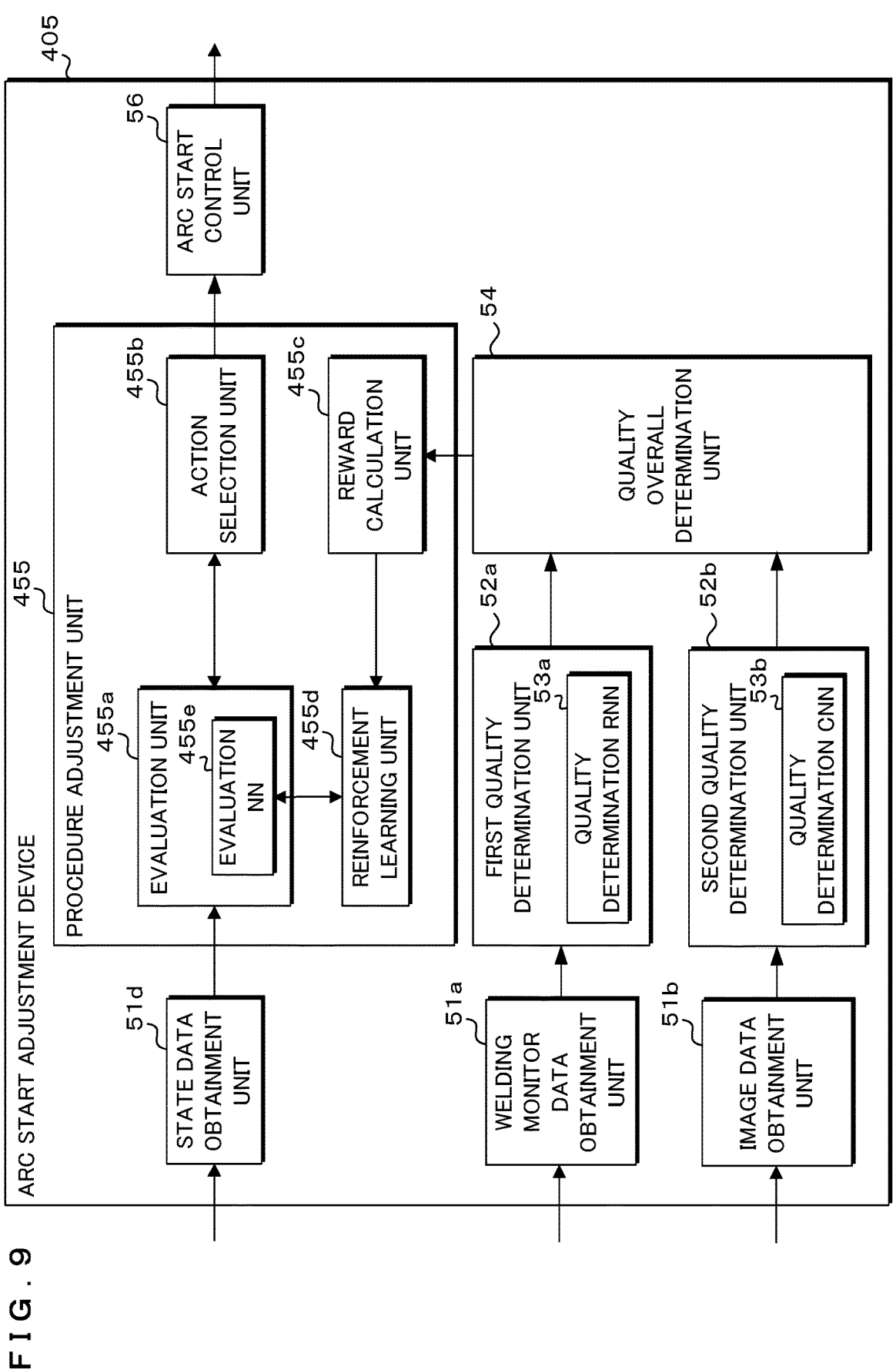
FIG. 9 is a functional block diagram depicting an arc start adjustment device according to Embodiment 4.

FIG. 9 is a functional block diagram depicting an arc start adjustment device 405 according to Embodiment 4. The arc start adjustment device 405, the welding system, the arc start adjustment method and the computer program 50d according to Embodiment 4 are different from Embodiment 1 in that the procedure adjustment unit 455 and the shortest-time procedure storage unit 57 according to Embodiment 4 are configured to train the arc start procedure by deep reinforcement learning, and thus the difference will mainly be discussed below. Since the other configurations and effects are the same as those in the embodiments described herein, the same reference numerals are given to the corresponding parts while the description thereof is omitted.

The arc start adjustment device 405 according to Embodiment 4 includes a welding monitor data obtainment unit 51a, an image data obtainment unit 51b, a state data obtainment unit 51d, a first quality determination unit 52a, a second quality determination unit 52b, a quality overall determination unit 54, the procedure adjustment unit 455 and an arc start control unit 56.

The state data obtainment unit 51d obtains state data indicative of the state (s) of a welding system. The state data includes, for example, image data, e.g., moving image data obtained by imaging the welding torch 11, the welding wire W and the base metal A at multiple time points in the arc start processing. The welding torch 11, the welding wire W and the base metal A may be imaged by the imaging device 4 or may be imaged by another moving image shooting device. Such a configuration is preferably employed that the moving image data includes image data that allows for image recognition of the state (s) of the welding system, that is, the positional relation among the welding torch 11, the welding wire W and the base metal A.

The procedure adjustment unit 455 is for training the arc start procedure that minimizes the cycle time of the welding process by deep reinforcement learning and is provided with an evaluation unit 455a, an action selection unit 455b, a reward calculation unit 455c and a reinforcement learning unit 455d.

The evaluation unit 455a is a computation function unit to calculate an evaluation value Q relative to an action (a) in a state indicated by the state data, based on the state data obtained by the state data obtainment unit 51d and the action data indicative of the action (a) concerning the arc start procedure. The state is, for example, a positional relation among the welding torch 11, the welding wire W and the base metal A or an image representing the positional relation. The action (a) concerning the arc start procedure is decided by a start of slowing down the wire feeding, a wire feeding speed, a start of supplying welding current, a welding current value, etc. The evaluation value Q increases as the cycle time of the welding process can suitably be shortened and the welding result is better when a specific action (a) is taken in the case where the welding torch 11, the welding wire W and the base metal A are in a specific positional relation.

The evaluation unit 455a includes an evaluation neural network (NN) 455e that outputs, in the case where state data indicative of a state (s) of the welding system obtained by the state data obtainment unit 51d and action data indicative of an action (a) concerning the arc start procedure are input, an evaluation value Q (s, a) relative to the action in the state (s). the evaluation NN 455e is stored in the storage 50c.

Note that the evaluation NN 455e may be provided with a convolutional neural network at the preceding stage to recognize state data representing the state of the welding system by images.

The action selection unit 455b selects an action (a) taken when the evaluation value Q calculated by the evaluation unit 455a in a certain state (s) is maximum. The procedure adjustment unit 455 performs adjustment of the arc start procedure based on the action (a) selected by the action selection unit 455b, and the arc start control unit 56 controls the arc start by the adjusted arc start procedure.

The reward calculation unit 455c calculates a reward for the arc start procedure based on the determination result output from the quality overall determination unit 54 and the time from when the welding torch 11 reaches a welding region to when the arc forms. The reward is calculated so as to increase as the welding result is better and the time until arc forms is shorter. The arithmetic expression to calculate a reward is not limited to a specific one.

The reinforcement learning unit 455d trains the evaluation NN 455e based on the state data and action data that are input to the evaluation NN 455e, the evaluation value Q output when respective data are input and the reward calculated by the reward calculation unit 455c. More specifically, the weighting factor of a neural network may be trained by the evaluation value Q represented by the following formula (1).

$$Q(s, a) \leftarrow Q(s, a) + \alpha(r + \gamma \max Q(s\_next, a\_next) \cdot Q(s, a)) \quad (1)$$

where
"s" represents a state;
"a" represents an action selected in the state (s);
"α" represents a learning coefficient;
"r" represents a reward obtained as a result of the action;
"γ" represents a discount rate;
"max Q (s_next, a_next)" represents a maximum value of the evaluation value Q for the action that will be taken in the next state.

The learning coefficient α is a positive value being equal to or less than 1 and a value on the order of 0.1, for example. The discount rate γ is a positive value equal to or less than 1 and a value on the order of 0.9, for example.

By the machine learning using the above-mentioned formula (1), the evaluation NN 455e can be trained such that a higher evaluation value Q is given to the action (a) from which a higher reward may be obtained. Note that upon reinforcement learning, a ε-greedy method or the like may be employed in which random actions are taken at a certain probability, and Q values for the various actions may be trained.

According to the arc start adjustment device 405 thus configured, the action selection unit 455b can select a more appropriate action (a), i.e., an action of starting to slow down the wire feeding and a wire slow down speed, an action of starting to supply welding current and a welding current value according to the state (s) of the welding system, i.e., the positional relation among the welding torch 11, the welding wire W and the base metal A, and can minimize the cycle time of the welding process.

According to the arc start adjustment device 405, the welding system, the arc start adjustment method and the computer program 50d in Embodiment 4, deep reinforcement learning of the arc start procedure that shortens the cycle time of the welding process is made possible.

Note that the deep reinforcement learning is described in the above-mentioned Embodiment 4, but such a configuration may be employed that the array of evaluation values Q corresponding to actions and states is provided in place of the neural network to thereby adjust the arc start procedure.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present disclosure is defined by the appended claims rather than by the description preceding them, and all changes that fall within metes and bounds of the claims, or equivalence of such metes and bounds thereof are therefore intended to be embraced by the claims.

What is claimed is:

1. An arc start adjustment device adjusting an arc start procedure in a welding process comprising:
   one or more processors;
   a storage storing instructions for causing the one or more processors to:
   obtain welding data from a welding power source, an imaging device or a microphone during or after the welding process, the welding data including data indicating at least one of welding current and welding voltage detected during the welding process, a feeding speed of a welding wire, a short-circuit situation, a welding sound collected during the welding process and an image of a welding region imaged after the welding process,
   automatically adjust the arc start procedure such that a cycle time of the welding process is shortened if a quality of welding is positive, and the cycle time of the welding process is extended if the quality of welding is negative,
   further comprising instructions for causing the one or more processors to:
   determine whether the quality of welding is positive or negative based on the welding data; and
   obtain state data including image data obtained by imaging a welding torch, a welding wire and a base metal at multiple time points in arc start processing, the state data representing a positional relation among the welding torch, the welding wire and the base metal,
   wherein the instructions to adjust the arc start procedure comprise a reinforcement learning model comprising instructions to:
   calculate an evaluation value for an action concerning the arc start procedure based on the state data and action data indicating the action, the action data including information concerning an action of starting to slow down the feeding speed, and a wire slow down speed, and an action of starting to supply welding current, and a welding current value, and the evaluation value increasing as the cycle time of the welding process can be shortened and the quality of welding is better;
   select the action for which the evaluation value is a maximum value;
   calculate a reward for the arc start procedure based on the quality of welding obtained after the arc start procedure is adjusted and a time from when the welding torch reaches a welding region to when an arc forms, the reward being calculated so as to increase as the quality of welding is better and the time from when the welding torch reaches the welding region to when the arc forms is shorter;
   train based on the state data, the action data and the reward; and
   start the arc using the adjusted arc start procedure in which the welding torch is moved to a welding start position.

2. The arc start adjustment device according to claim 1, wherein the storage stores an evaluation neural network to output an evaluation value for the action in the state indicated by the state data when the state data and the action data arc start procedure are input; and the instructions to calculate the reward comprise instructions to calculate the evaluation value by using the evaluation neural network.

3. A welding system comprising:

the arc start adjustment device according to claim 1;

a welding robot with a welding torch; and a welding power source that supplies welding current to the welding torch.

4. An arc start adjustment method of adjusting an arc start procedure in a welding process, comprising:

obtaining welding data indicating a welding state during or after the welding process; and adjusting the arc start procedure according to claim 1 such that a cycle time of the welding process is shortened based on obtained welding data.

* * * * *